United States Patent [19]
Shihou

[11] Patent Number: 5,883,871
[45] Date of Patent: Mar. 16, 1999

[54] INFORMATION RECORDING/REPRODUCTION APPARATUS WITH SHUTTER OPENING/CLOSING MECHANISM ON UPPER SURFACE OF CARTRIDGE HOLDER

[75] Inventor: Makoto Shihou, Yokohama, Japan

[73] Assignee: Canon Kabushiki Kaisha, Tokyo, Japan

[21] Appl. No.: 975,916

[22] Filed: Nov. 21, 1997

Related U.S. Application Data

[63] Continuation of Ser. No. 489,459, Jun. 12, 1995, abandoned.

[30]  Foreign Application Priority Data

Jun. 13, 1994 [JP] Japan .................................. 6-130182

[51] Int. Cl.$^6$ ........................................................ G11B 17/04
[52] U.S. Cl. ................... 369/77.2; 360/99.02; 360/99.06
[58] Field of Search .................................. 369/77.1, 77.2; 360/99.02, 99.06

[56]  References Cited

U.S. PATENT DOCUMENTS 5,088,085  2/1992  Uehara .................................. 369/77.2
5,153,867  10/1992  Inoue .................................. 369/77.2
5,187,622  2/1993  Watanabe .............................. 360/99.02
5,448,434  9/1995  Hirose .................................. 369/77.1

FOREIGN PATENT DOCUMENTS 56-71847  6/1981  Japan .................................. 360/96.5
61-292287  12/1986  Japan .................................. 360/96.5
5-274765  10/1993  Japan .................................. 369/77.1

Primary Examiner—William J. Klimowicz
Attorney, Agent, or Firm—Fitzpatrick, Cella, Harper & Scinto

[57]  ABSTRACT

In an information recording/reproducing apparatus, there is provided a mechanism for opening/closing a shutter of a cartridge having a case for storing a recording medium. The shutter is adapted to be slidable in a recess portion on a case surface. The cartridge is held by a holder. A shutter opening/closing device is arranged on an upper surface of the holder so as to open/close the shutter of the cartridge. A projection is formed in front of the shutter opening/closing device in an insertion direction of the cartridge with respect to the holder, on the inner surface of the holder facing the cartridge.

1 Claim, 6 Drawing Sheets

INFORMATION RECORDING/ REPRODUCTION APPARATUS WITH SHUTTER OPENING/CLOSING MECHANISM ON UPPER SURFACE OF CARTRIDGE HOLDER

This application is a continuation of application Ser. No. 08/489,459 filed Jun. 12, 1995, now abandoned.

BACKGROUND OF THE INVENTION

1. Field of the Invention

The present invention relates to an information recording/ reproduction apparatus which comprises a shutter opening/ closing mechanism on the upper surface of a cartridge holder.

2. Related Background Art

A conventional disk cartridge which stores a recording medium therein has a shutter which is free to open/close. An information recording/reproduction apparatus for performing recording, reproducing, and erasing of information with respect to a recording medium has a shutter opening/closing mechanism. This mechanism opens the shutter of a disk cartridge when the cartridge is inserted in a disk cartridge device, and closes the shutter of the cartridge when the cartridge is ejected from the device.

In particular, as a loading method of a disk cartridge for the information recording/reproduction apparatus, a method of moving a disk cartridge inserted in the device in a direction perpendicular to the disk surface is used. However, in order to meet recent requirements for a low-profile information recording/reproduction apparatus, a method of moving a spindle motor is proposed. In this method, the disk cartridge is not moved in the direction perpendicular to the disk surface, but a spindle motor for moving the disk is moved with respect to the loaded disk.

This method will be explained below using an information recording/reproduction apparatus (a magnetooptical recording/reproduction apparatus) shown in FIGS. 1A to 2B. FIGS. 1A and 2A show a state before a disk cartridge is inserted in a device, and FIGS. 1B and 2B show a state upon completion of loading of the disk cartridge.

A magnetooptical disk 1 is stored in a disk cartridge 2. A shutter 3 is arranged on the disk cartridge 2 to cover the opening portion of the disk cartridge 2 to be free to open/ close it. Furthermore, a cartridge holder 4 guides the cartridge 2 inserted in the device to the operation position, and is fixed to a frame. Cam grooves 5 and 6 are formed on the upper surface of the cartridge holder 4, and the two ends of a shutter opening/closing lever 7 are respectively guided along these cam grooves 5 and 6. A guide pin 8, which can engage with the cam groove 5, is formed on one end of the shutter opening/closing lever 7, and a shutter opening/ closing pin 9 projects from the other end of the lever 7. The shutter opening/closing pin 9 engages with an end portion 3a of the shutter 3, and is guided along the cam groove 6.

A torsion spring 10 has the following arrangement. One end portion 10b of a coil portion 10a of the spring 10 is supported by the upper surface of the cartridge holder 4, and the other end portion 10c engages with an upright portion 7a of the shutter opening/closing lever 7. For this reason, the shutter opening/closing lever 7 is biased to a position shown in FIG. 1A when no cartridge is inserted. Note that a bias magnet 11 applies a bias magnetic field, and is fixed and supported on the upper surface of the cartridge holder 4.

FIG. 4 is a sectional view of a portion near a shutter opening/closing lever 7. In FIG. 4, a guide pin 18 is constituted by a columnar portion engaging with a cam groove 15 and a flange portion 18a for preventing the guide pin 18 from disengaging from the cam groove 15. A ring-shaped collar 14 is rotatably arranged on a portion, engaging with a cam groove 16, of a shutter opening/closing pin 19. A stop ring 13 prevents the shutter opening/closing pin 19 from disengaging from the cam groove 16. Since the collar 14 arrangement is provided, the frictional force acting between the shutter opening/closing pin 19 and the cam groove 16 is reduced, thus preventing wear.

One end of a pivot plate 21 is supported by the frame to be pivotal about pins (shafts) 42a and 42b. A spindle motor 22 for rotating the disk 1, and alignment pins 27a to 27d for aligning the cartridge 2 are fixed on the pivot plate 21. Note that, in addition, a driving system having a linear motor, an optical head (not shown), and the like are fixed to the frame.

Guide rollers 23a and 23b are pivotally arranged on the side surfaces of the pivot plate 21. A slide cam 24 is arranged to be slidable in a direction parallel to the insertion direction of the cartridge. Cam grooves 25 engaging with the guide rollers 23a and 23b are formed on upright portions of the slide cam 24 to be located at the two sides of the guide rollers 23a and 23b. Each cam groove 25 is defined by a horizontal portion 25a and an inclined portion 25b.

The slide cam 24 has guide grooves 24a and 24b, which slidably engage with guide pins 26a and 26b projecting from the frame. The slide cam 24 is always biased toward a front panel 30 having a cartridge insertion hole 29 by torsion springs 28a and 28b.

A detection lever 35 is supported to be pivotal about a shaft 36 projecting from the frame, and is biased in the direction of an arrow in FIG. 1A by a torsion spring 37. In the state shown in FIG. 1A, a recess portion 35a of the detection lever 35 engages with a lock pin 38 formed on the slide cam 24 and holds the slide cam 24 at a position separated from the front panel 30 against the biasing force of the torsion springs 28a and 28b.

When the cartridge 2 is inserted in the device, an end portion 35b of the detection lever 35 is pushed by the front end of the cartridge 2, and the engaging state between the recess portion 35a and the lock pin 38 is released. For this reason, the slide cam 24 moves toward the front panel side by the biasing force of the torsion springs 28a and 28b.

An eject motor unit 39 is constituted by a rotary disk 40 rotated by the motor, and a pin 41 arranged near the outer periphery of the rotary disk 40. When the cartridge is to be ejected, the pin 41 rotates in the direction of an arrow in FIG. 1A, and pushes a projection 24e, contacting the pin 41, of the slide cam 24, thereby moving the slide cam 24 backward.

An operation upon loading of the cartridge will be described below. FIGS. 1A and 2A show a state before loading of the cartridge 2. When the disk cartridge 2 is inserted into the device from the state shown in FIGS. 1A and 2A, the shutter opening/closing pin 9 of the shutter opening/closing lever 7 contacts the end portion 3a of the shutter 3. When the cartridge 2 is further inserted, the shutter opening/closing lever 7 pivots in the direction of an arrow in FIG. 1A to open the shutter.

When the shutter opening/closing pin 9 of the shutter opening/closing lever 7 is guided to a linear portion 6a of the cam groove 6, the shutter 3 is opened completely, and thereafter, the cartridge 2 is pushed into the device while the shutter 3 is kept open. Immediately before the cartridge 2 reaches a position shown in FIG. 1B, the side surface of the cartridge 2 contacts the end portion 35b of the detection lever 35. When the cartridge is further pushed to the end, the detection lever 35 is rotated in a direction opposite to the direction of the arrow, and the engaging state between the recess portion 35a and the lock pin 38 is released, as shown in FIG. 1B. When this engaging state is released, the slide cam 24 moves to the position illustrated in FIGS. 1B and 2B by the biasing force of the springs 28a and 28b.

Before loading, the guide rollers 23a and 23b of the pivot plate 21 are located in the horizontal portions 25a of the corresponding cam groove 25 of the slide cam 24, and the free end side of the pivot plate 21 is located at the lower position. For this reason, the spindle motor 22, and the alignment pins 27a to 27d do not disturb the insertion of the cartridge 2. Upon movement of the slide cam 24, the guide rollers 23a and 23b are guided along the inclined portion 25b of the cam grooves 25. In this case, the pivot plate 21 is pivoted about the shafts 42a and 42b, and contacts a contact surface 4a of the cartridge holder 4. With this operation, the spindle motor 22 and the alignment pins 27a to 27d move upward, and respectively achieve clamping of the disk and the alignment of the cartridge.

FIG. 5 is a perspective view showing the cartridge 2 with the shutter 3 which is fully opened. The shutter 3 is supported to be slidable in a recess portion 2b of the cartridge 2. Since both a bridge portion 2a of the cartridge 2 and a portion 3b of the shutter 3 are formed to have substantially the same thickness as that of the disk 1, the cartridge 2 will not contact the bias magnet 11 and an optical head (not shown) if the shutter 3 is quickly opened as in this example.

An operation upon ejection of the cartridge is performed as follows. Upon reception of an eject command, the rotary disk 40 of the eject motor unit 39 begins to rotate from the position shown in FIG. 1B in the direction of the arrow, and the pin 41 pulls the slide cam 24 backward against the biasing force of the springs 28a and 28b. Since the guide rollers 23a and 23b, which are located in the inclined portions 25b of the cam grooves 25 of the slide cam 24, are guided to the horizontal portions 25a of the cam grooves 25 upon movement of the slide cam 24, the free end portion side of the pivot plate 21 moves downward, as shown in FIG. 2A. Therefore, the spindle motor 22 and the alignment pins 27a to 27d also move downward, thus allowing ejection of the disk cartridge 2.

In the state shown in FIG. 1B, since the lock pin 38 of the slide cam 24 contacts a linear portion 35c of the detection lever 35, the detection lever 35 cannot be pivoted. However, when the slide cam 24 moves to almost the end, the lock pin 38 is separated from the linear portion 35c, and the detection lever 35 is pivoted in the direction of the arrow by the biasing force of the torsion spring 37. By the pivoting force of the detection lever 35, the cartridge 2 is ejected from the cartridge holder 4. The state shown in FIG. 1A is attained when the pin 41 of the eject motor unit 39 reaches a position A. However, when the eject motor is stopped in this state, the slide cam 24 cannot move forward upon execution of the next loading. For this reason, the eject motor is rotated by half a revolution, and is stopped at a position B using a limit switch (not shown), and the like.

As described above, since the plate on which the spindle motor is attached moves upward/downward upon loading and ejection of the disk cartridge, the device space can be efficiently utilized.

However, in the prior art, as shown in FIG. 4, since the flange portion 18a of the guide pin 18 is arranged at the inner side of the cartridge holder 4, the flange portion 18a contacts the cartridge 2. FIG. 3 shows a state immediately before the shutter of the disk cartridge is almost fully opened upon insertion of the cartridge 2 in the cartridge holder 4. In this state, the flange portion 18a is located immediately above the recess portion (hatched portion) 2b of the cartridge 2. When the cartridge 2 is further pushed, the flange 18a moves along the cam groove 5 and passes an edge 2c of the recess portion 2b. However, since the flange portion 18a slightly projects into the cartridge holder 4, the flange portion 18a passes the edge 2c while climbing over it.

Therefore, when cartridge insertion is repeated, the edge 2c is worn. In some cases, the flange portion 18a may be caught by the edge 2c. If the cartridge is pushed by force into the cartridge holder while caught by the edge 2c, since the force directly acts on the cartridge 2 and the shutter opening/closing lever 7, the cartridge 2 and the shutter opening/closing lever 7 may be damaged (e.g., disengaged due to deformation) if the cartridge is handled carelessly.

SUMMARY OF THE INVENTION

The present invention has been made in consideration of the above situation, and has as its object to provide a highly reliable information recording/reproduction apparatus, which can prevent a cartridge and a shutter opening/closing lever from being damaged even when the cartridge is inserted carelessly and repetitively.

In order to achieve the above object, there is provided an information recording/reproduction apparatus, which comprises a mechanism for opening/closing a shutter of a cartridge having a case for storing a recording medium, the shutter being slidable in a recess portion on a case surface, comprising:

a holder for holding the cartridge;

shutter opening/closing means, arranged on an upper surface of the holder, for opening/closing the shutter of the cartridge; and a projection which is formed in front of the shutter opening/closing means in an insertion direction of the cartridge with respect to the holder, and on the upper surface of the holder.

In order to achieve the above object, there is also provided an information recording/reproduction apparatus, which comprises a mechanism for opening/closing a shutter of a cartridge having a case for storing a recording medium, the shutter being slidable in a recess portion on a case surface, comprising:

a holder for holding the cartridge; and shutter opening/closing means, arranged on an upper surface of the holder, for opening/closing the shutter of the cartridge, the shutter opening/closing means having first and second cam grooves formed on the upper surface of the holder, and shutter engaging means which engages with the shutter, wherein the shutter opening/closing means opens/closes the shutter when the shutter engaging means moves while a first point thereof near a shutter engaging portion is guided along the first cam groove and a second point thereof is guided along the second cam groove, and the second cam groove is formed at a position where, upon insertion of the cartridge, a portion, projecting into the holder, of a part constituting the second point of the shutter engaging means does not enter a recess portion formed on the case surface of the cartridge.

In order to achieve the above object, there is also provided an information recording/reproduction apparatus, which comprises a mechanism for opening/closing a shutter of a cartridge having a case for storing a recording medium, the shutter being slidable in a recess portion on a case surface, comprising:

a holder for holding the cartridge; and shutter opening/closing means, arranged on an upper surface of the holder, for opening/closing the shutter of the cartridge, the shutter opening/closing means comprising:

a linear first cam groove formed on the upper surface of the holder;

a second cam groove formed on the upper surface of the holder and defined by linear and curved portions;

a first slidable member which is slidably fitted in the first cam groove;

a second slidable member which is slidably fitted in the second cam groove and engages the shutter upon opening/closing of the shutter of the cartridge;

a lever member for supporting the first and second slidable members; and a biasing member for biasing the lever member in a direction opposite to an insertion direction of the cartridge, wherein when the cartridge is inserted into the holder, an end portion of the shutter contacts the second slidable member; when the cartridge is further inserted, the cartridge moves the second slidable member, and opens the shutter while pivoting the lever member about the first slidable member as a fulcrum; and when the cartridge is still further inserted, the shutter is fully opened during the insertion, and thereafter, the first and second slidable members and the lever member move together in the insertion direction.

The above and other objects of the present invention will become apparent from the following description of the embodiments.

BRIEF DESCRIPTION OF THE DRAWINGS

FIGS. 1A and 1B show an example of the prior art, in which FIG. 1A is a plan view showing a state immediately before insertion of a cartridge, and FIG. 1B is a plan view showing a state after insertion of the cartridge;

FIGS. 8A and 8B show another embodiment of the present invention, in which FIG. 8A is a plan view showing a state immediately before insertion of a cartridge of the embodiment, and FIG. 8B is a plan view showing a state after insertion of the cartridge.

DETAILED DESCRIPTION OF THE PREFERRED EMBODIMENTS (First Embodiment)

Figure 1A:
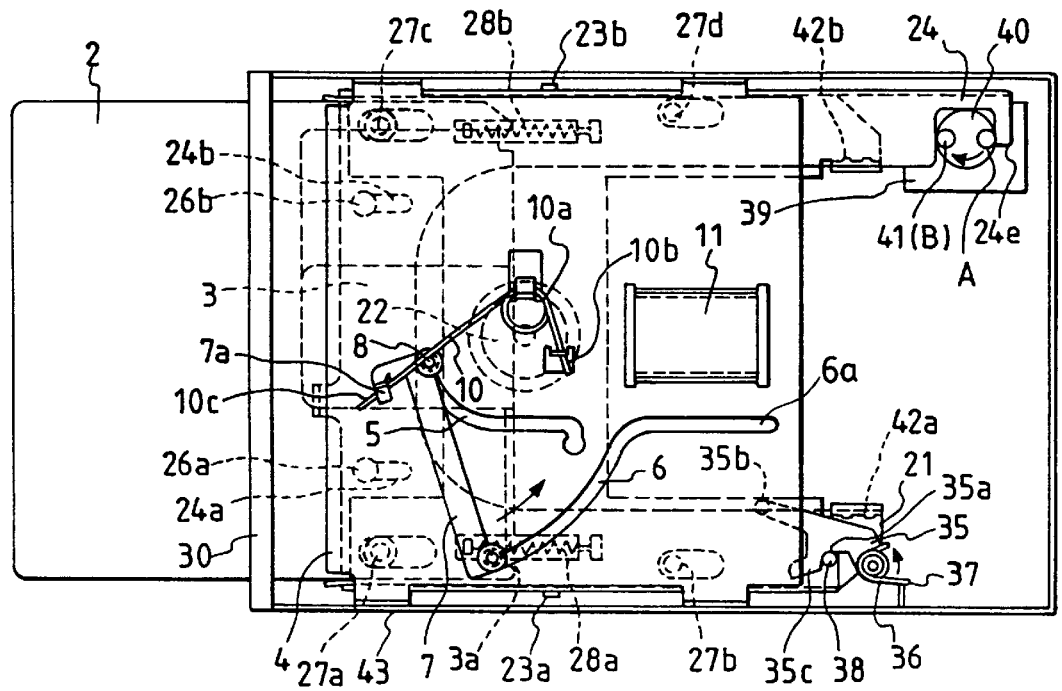
Figure 1B:
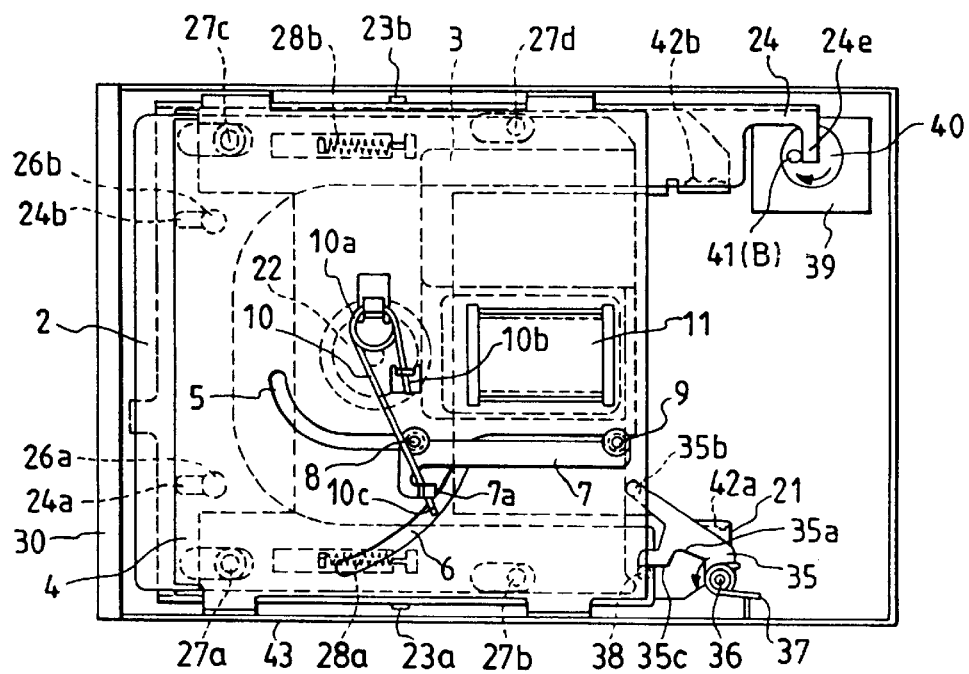
Figure 2A:
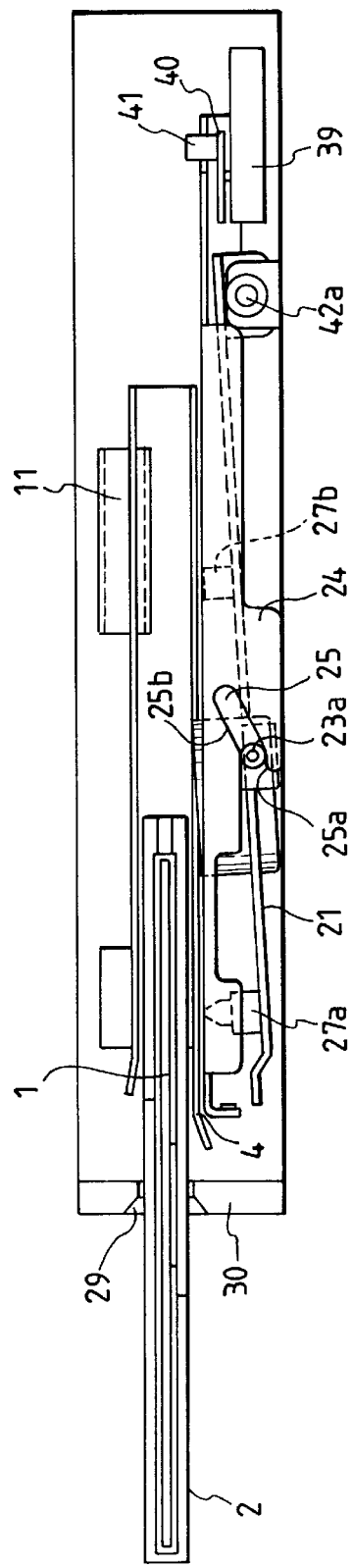
FIG. 2A is a longitudinal sectional view showing a state immediately before insertion of the cartridge shown in FIG. 1A.
Figure 2B:
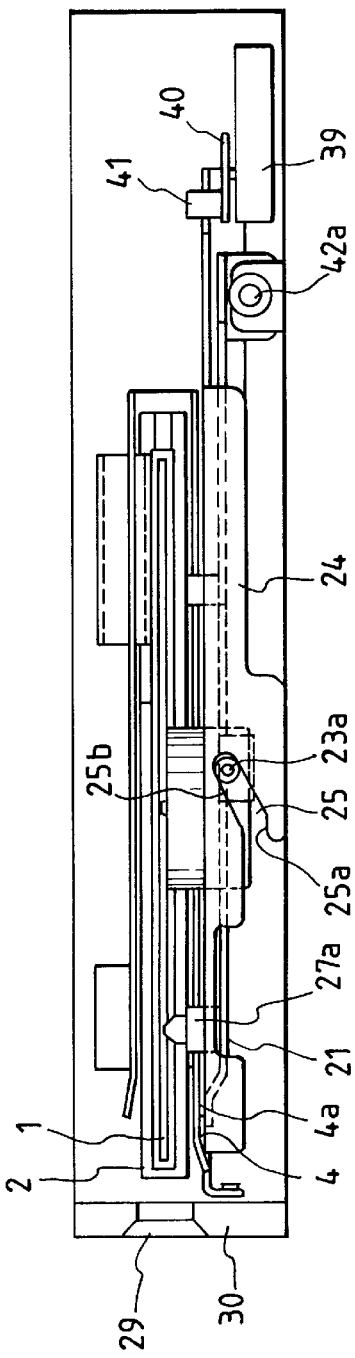
FIG. 2B is a longitudinal sectional view showing a state after insertion of the cartridge shown in FIG. 1B
Figure 3:
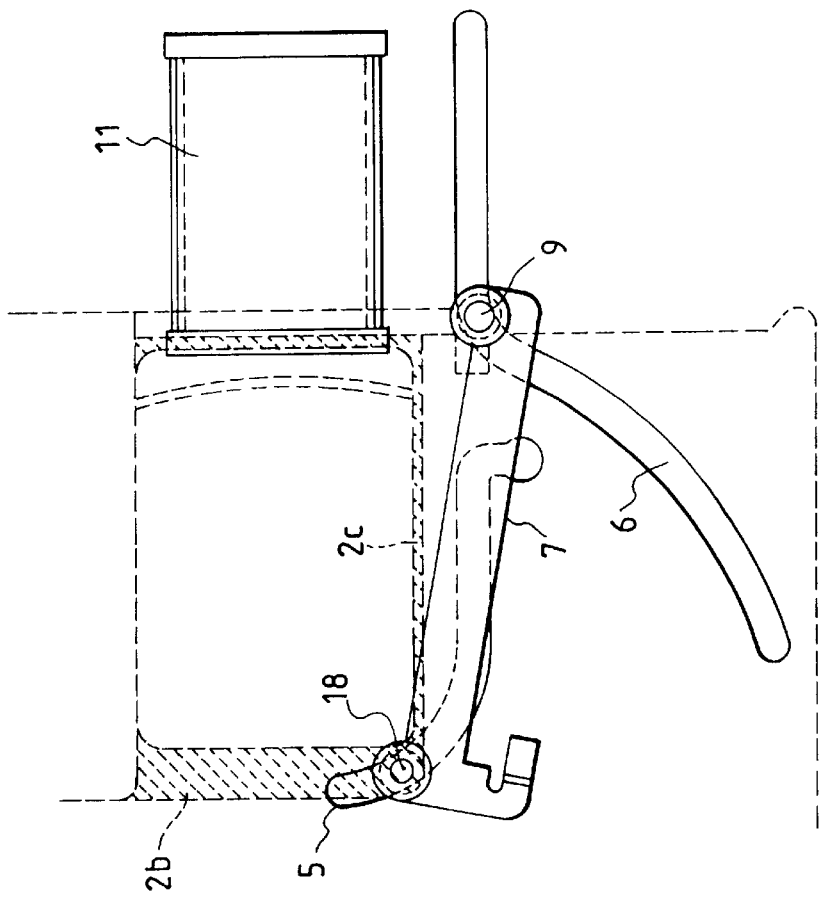
FIG. 3 is a plan view showing a principal part of FIGS. 1A and 1B.
Figure 4:
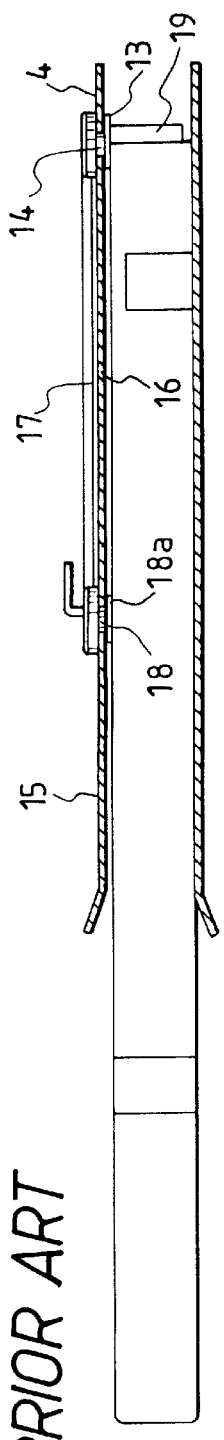
FIG. 4 is a plan view showing a principal part of FIGS. 1A and 1B.
Figure 5:
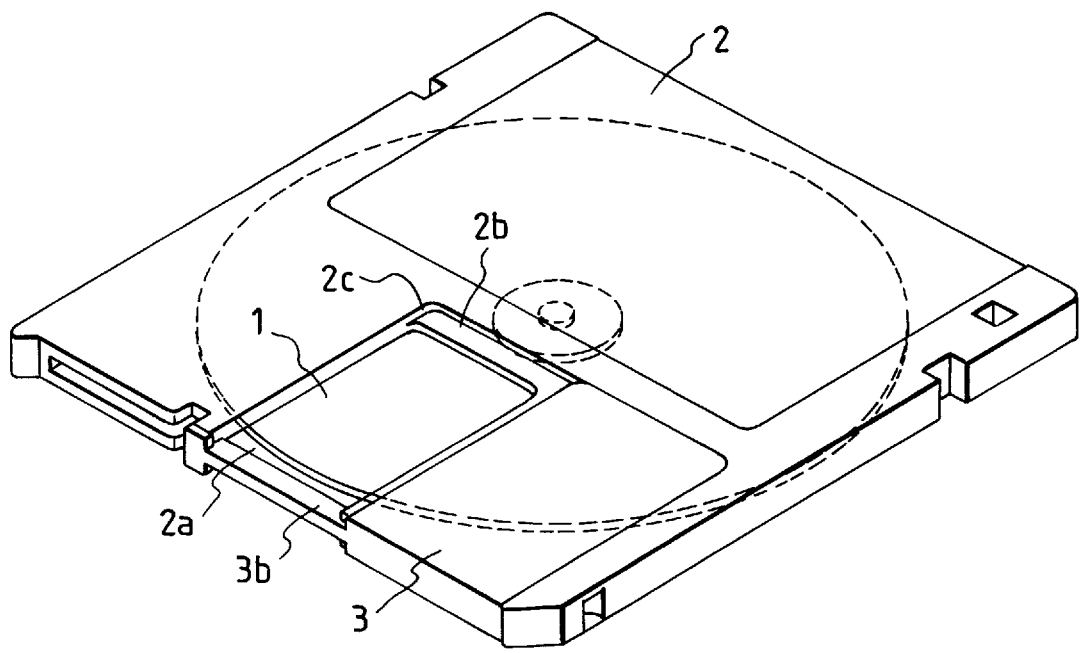
FIG. 5 is a perspective view showing the entire cartridge shown in FIGS. 1A and 1B.
Figure 6:
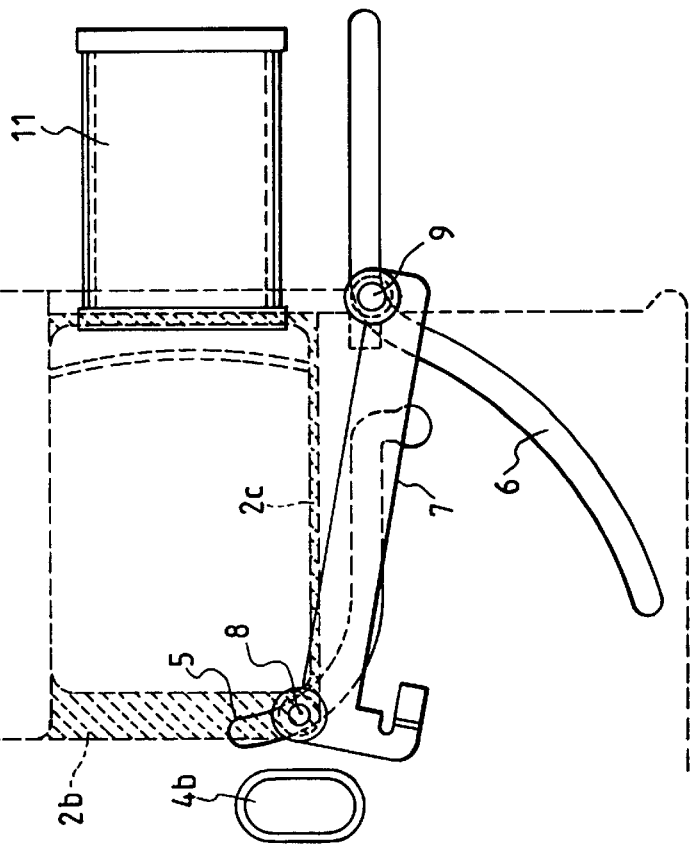
FIG. 6 is a plan view showing a principal part of an embodiment of the present invention.
Figure 7:
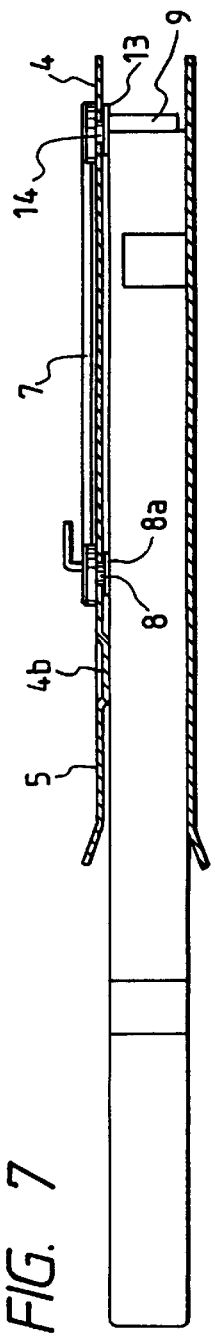
FIG. 7 is a side view of FIG. 6.

An embodiment of the present invention will be described in detail below with reference to FIGS. 6 and 7. FIG. 6 shows in detail a principal part during insertion of a disk cartridge into a device, and FIG. 7 is a sectional view of a cartridge holder 4 including a shutter opening/closing lever 17. Since the arrangement of the cartridge holder 4 is substantially the same as that of the prior art, except for a projection 4b formed near the cartridge insertion side of a cam groove 5, a detailed description thereof will be omitted. The projection 4b projects into the cartridge holder 4, and its height is substantially equal to or larger than the projecting amount of a flange portion 18a of a guide pin 18 into the cartridge holder 4.

The outer circumferential surface of the projection 4b is contiguous with the upper surface of the cartridge holder to have an inclination of a relatively slow angle, so that an inserted cartridge 2 will not be caught by the projection 4b. The cartridge 2 inserted into the cartridge holder 4 moves along the cartridge holder 4, and the leading end of the cartridge rides on the projection 4b. Therefore, since the cartridge 2 is inserted while being guided along the lower surface side of the cartridge holder 4, the upper surface of the cartridge 2 hardly contacts the flange portion 18a of the guide pin 18. When the cartridge has been inserted to the state shown in FIG. 6, the central portion of the upper surface of the cartridge is guided along the lower surface side due to the presence of the projection 4b. For this reason, the cartridge can be smoothly inserted so that the flange portion 18a is not caught by an edge 2c of a recess portion 2b of the cartridge.

(Second Embodiment)

Figure 8A:
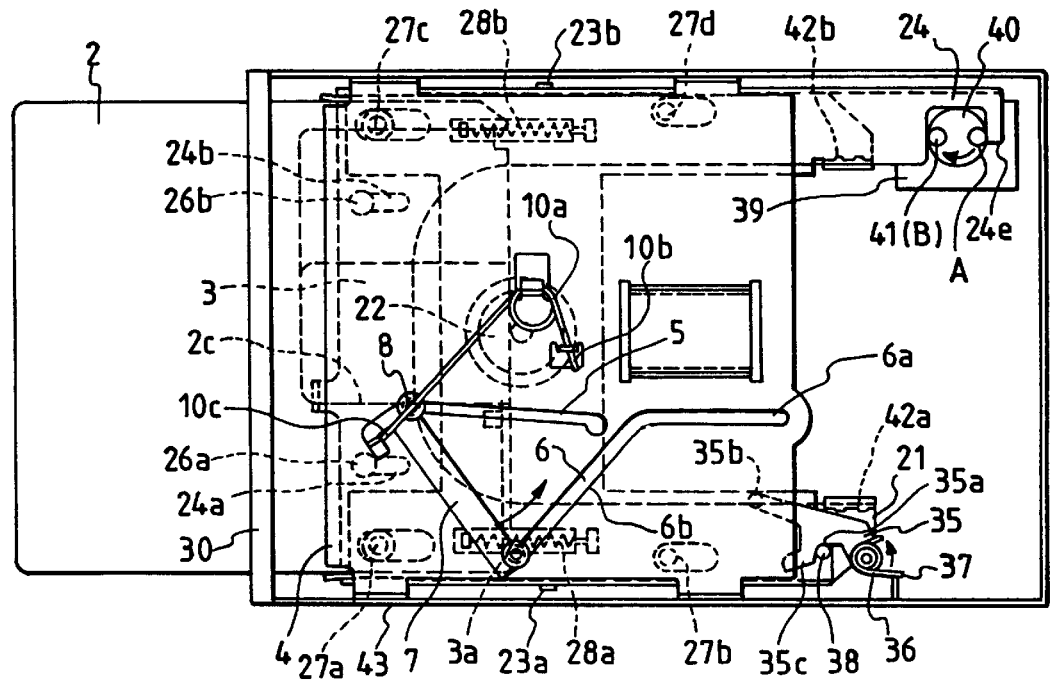
Figure 8B:
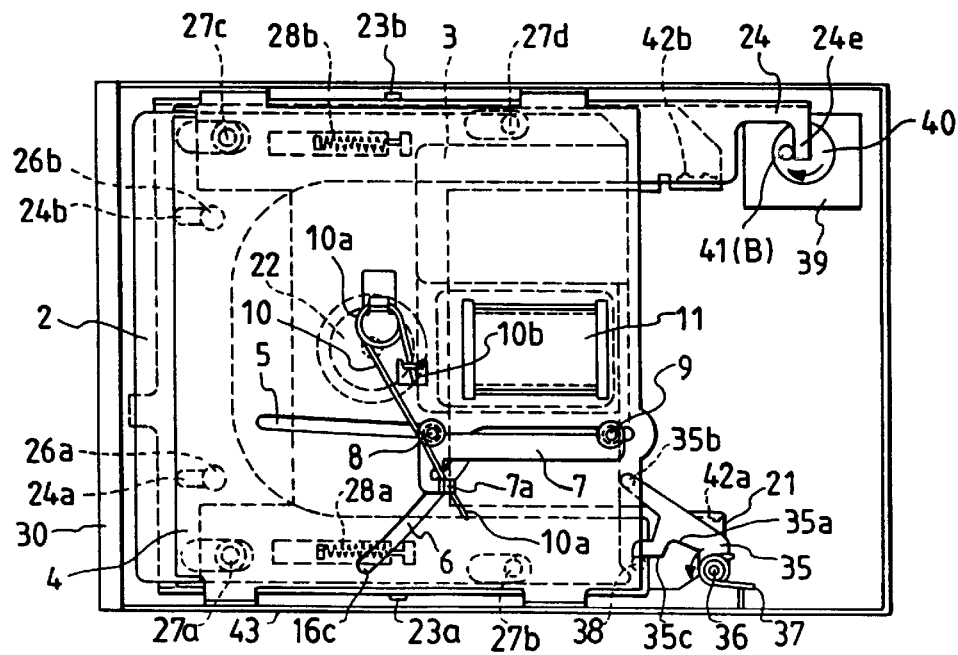

FIGS. 8A and 8B show another embodiment. FIG. 8A shows a state before insertion of a disk cartridge into a device, and FIG. 8B shows a state upon completion of loading of the disk cartridge. Since the arrangement of the disk cartridge is substantially the same as that in the prior art, except for its shutter opening/closing mechanism, a detailed description thereof will be omitted.

Cam grooves 5 and 6 are formed on the upper surface of a cartridge holder 4, and the two ends of a shutter opening/closing lever 7 are respectively guided along these cam grooves 5 and 6. A guide pin 8 which can engage with the cam groove 5 is arranged on one end of the shutter opening/closing lever 7, and a shutter opening/closing pin 9 projects from the other end of the lever 7. The shutter opening/closing pin 9 engages with an end portion 3a of a shutter 3, and is guided along the cam groove 6.

In a torsion spring 10, one end portion 10b of its coil portion 10a is supported on the upper surface of the cartridge holder 4, and the other end portion 10c engages with an upright portion 7a of the shutter opening/closing lever 7. For this reason, before the cartridge is inserted, the shutter opening/closing lever 7 is biased to a position illustrated in FIG. 8A. The cam groove 5 has a linear shape, and is formed at a position where the flange portion 8a of the guide pin 8 of the shutter opening/closing lever, which is biased to the position illustrated in FIG. 8A, does not enter a recess portion formed on the case surface of the cartridge.

The cam groove 6 is defined by a first linear portion 6a parallel to the insertion direction of the cartridge, a second linear portion 6b having a predetermined inclination from the insertion direction of the cartridge, and an arc portion 6c smoothly connected to the second linear portion. The first and second linear portions 6a and 6b are smoothly connected to each other via an R portion. The arc portion 6c as an arcuated shape, which allows pivotal motion of the shutter opening/closing lever 7 while the guide pin 8 is biased by an end portion 5a of the cam groove 5. The second linear portion 6b is formed tangentially to the arc portion 6c. The cam groove 5 makes a small angle with the insertion direction of the cartridge so as to prevent the shutter opening/closing lever 7 from projecting toward the cartridge insertion hole before insertion of the cartridge. With this arrangement, a long shutter opening/closing lever 7 can be used, and the cam grooves 5 and 6 can be prevented from being connected with each other.

An operation upon loading of the cartridge will be explained below. FIG. 8A shows the state before loading of the cartridge 2. In this state, the flange portion 18a of the guide pin 8 is located almost immediately above the edge 2c of the recess portion 2b of the cartridge 2. Therefore, the flange portion 8a does not enter the recess portion 2b of the cartridge 2. When the disk cartridge 2 is inserted into the device, the shutter opening/closing pin 9 of the shutter opening/closing lever 7 contacts the end portion 3a of the shutter 3.

When the cartridge 2 is further inserted, the shutter opening/closing lever 7 is pivoted in the direction of an arrow in FIG. 8A to gradually open the shutter 3. When the shutter opening/closing pin 9 begins to move along the second linear portion 6b of the cam groove 6, the guide pin 8 also begins to move along the cam groove 5.

When the shutter opening/closing pin 9 is guided from the second linear portion 6b to the first linear portion 6a via the state shown in FIG. 7, the shutter 3 is completely opened, and thereafter, the cartridge 2 is pushed into the device while the shutter 3 is kept open. Since the subsequent operation is the same as that in the prior art, a detailed description thereof will be omitted.

As described above, according to the present invention, since a projection, which projects into a cartridge holder, is formed near the cartridge insertion side of a second cam groove of two cam grooves formed on the upper surface of the cartridge holder, or since the second cam groove is formed at a position where a flange portion of a guide pin of a shutter opening/closing lever does not enter a recess portion formed on the case surface of a cartridge, the cartridge can be prevented from wearing upon insertion of the cartridge, and will not be damaged if it is handled carelessly.

What is claimed is:

1. An information recording/reproduction apparatus for recording information on or reproducing information from a recording medium contained in a cartridge having a shutter, the apparatus comprising:

a holder for holding the cartridge;

shutter opening/closing means, arranged on an inner surface of said holder facing said cartridge, for opening/closing the shutter of the cartridge, said shutter opening/closing means comprising:

first and second cam grooves formed on the inner surface of said holder, a first slidable member slidably fitted in said first cam groove, a second slidable member slidably fitted in said second cam groove and engagable with the shutter upon opening/closing of the shutter of the cartridge, a lever member that supports said first and second slidable members, and a biasing member that biases said lever member in a direction opposite an insertion direction, wherein when the cartridge is inserted into said holder, an end portion of the shutter contacts said second slidable member, when the cartridge is further inserted, the cartridge moves said second slidable member to cause the shutter to be opened while pivoting said lever member about said first slidable member as a fulcrum, when the cartridge is still further inserted, the shutter is fully opened during the insertion, and thereafter, said first and second slidable members and said lever member move together in the insertion direction; and a projection which is formed in front of said first slidable member in the insertion direction of the cartridge with respect to said holder, and in alignment with said first slidable member in the insertion direction of the cartridge holder, on said inner surface of said holder, wherein a projection amount of said projection into the interior of the holder is greater than the projection amount of the first slidable member into the interior of the holder.

* * * * *

UNITED STATES PATENT AND TRADEMARK OFFICE
CERTIFICATE OF CORRECTION

PATENT NO. : 5,883,871
DATED : March 16, 1999
INVENTOR(S) : MAKOTO SHIHOU

It is certified that error appears in the above-indentified patent and that said Letters Patent is hereby corrected as shown below:

Column 6

Line 4, "17." should read --7--.

Column 7

Line 12, "portion 18a" should read --portion 8a--.

Column 8

Line 6, "cartridge;" should read --cartridge; and--.
    Line 19, "members, and" should read --members,--.

Signed and Sealed this

Fifth Day of October, 1999

*Attest:*

Q. TODD DICKINSON

*Attesting Officer*     *Acting Commissioner of Patents and Trademarks*